(12) United States Patent  (10) Patent No.: US 7,444,499 B2
Davis et al.  (45) Date of Patent: Oct. 28, 2008

(54) METHOD AND SYSTEM FOR TRACE GENERATION USING MEMORY INDEX HASHING

(75) Inventors: John D. Davis, Los Altos Hill, CA (US); Cong Fu, San Jose, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 21 days.

(21) Appl. No.: 11/391,116

(22) Filed: Mar. 28, 2006

(65) Prior Publication Data

US 2007/0234016 A1    Oct. 4, 2007

(51) Int. Cl.
*G06F 11/00*    (2006.01)
(52) U.S. Cl. ......................................... 712/227; 703/22
(58) Field of Classification Search ................. 712/227; 703/22
See application file for complete search history.

(56) References Cited

U.S. PATENT DOCUMENTS

| | | | |
|---|---|---|---|
| 6,145,121 A | 11/2000 | Levy et al. | |
| 6,687,883 B2 | 1/2004 | Berry et al. | |
| 6,725,448 B1 * | 4/2004 | Moriya et al. | 717/119 |
| 6,766,511 B1 | 7/2004 | Berry et al. | |
| 6,789,156 B1 | 9/2004 | Waldspurger | |
| 6,854,051 B2 * | 2/2005 | Mukherjee | 712/248 |
| 6,931,516 B2 * | 8/2005 | Douglas et al. | 712/219 |
| 6,938,252 B2 * | 8/2005 | Baylor et al. | 718/102 |
| 6,952,664 B1 | 10/2005 | Lahiri et al. | |
| 6,988,263 B1 | 1/2006 | Hussain et al. | |
| 7,137,120 B2 * | 11/2006 | Armstrong et al. | 718/107 |
| 2003/0005271 A1 * | 1/2003 | Hsu et al. | 712/237 |
| 2003/0033511 A1 * | 2/2003 | Akkary et al. | 712/235 |
| 2004/0255045 A1 * | 12/2004 | Lim et al. | 709/245 |
| 2005/0138471 A1 * | 6/2005 | Okbay et al. | 714/25 |
| 2005/0144602 A1 * | 6/2005 | Ngai et al. | 717/151 |
| 2006/0112261 A1 | 5/2006 | Yourst | |

OTHER PUBLICATIONS

Black, Bryan etal. The Block-based Trace Cache, 1999, IEEE, pp. 196-207.*

U.S. Appl. No. 10/881,714, (Grohoski et al.).

(Continued)

*Primary Examiner*—Eric Coleman
(74) *Attorney, Agent, or Firm*—Robert C. Kowert; Anthony M. Petro; Meyertons, Hood, Kivlin, Kowert & Goetzel, P.C.

(57) ABSTRACT

A method and system for trace generation using memory index hashing. A method may include generating an extended trace representative of M threads of instruction execution from a trace representative of N threads of instruction execution, where N and M are integers, N≧1 and M>N, and where each of the N threads of the trace includes memory references to respective memory addresses. Generating the extended trace from the trace may include replicating the N threads to generate the M threads, assigning a respective identifier to each of the M threads, and for a given one of the M threads, hashing a first portion of each of the respective addresses dependent upon the respective identifier of the given thread, where the first portion of each of the respective addresses corresponds to at least part of an index of a memory structure shared by at least two of the M threads.

20 Claims, 7 Drawing Sheets

OTHER PUBLICATIONS

Lisa Hsu, et al., "Exploring the cache design space for large scale CMPs," ACM SIGARCH Computer Architecture News, vol. 33, issue 4 (Nov. 2005), 10 pages.

Xiaohan Qin, et al., "A comparative study of conservative and optimistic trace-driven simulations," Proceedings of the 28th Annual Simulation Symposium (1995), 9 pages.

John D. Davis, et al., "The RASE (Rapid, Accurate Simulation Environment) for Chip Multiprocessors," ACM SIGARCH Computer Architecture News, vol. 33, Issue 4 (Nov. 2005), 10 pages.

* cited by examiner

| Fetch (F) | T0 | T3 | T6 | T2 | T7 | T5 | T1 | T4 |
|---|---|---|---|---|---|---|---|---|
| Cache (C) | | T0 | T3 | T6 | T2 | T7 | T5 | T1 |
| Pick (P) | | | T0 | T3 | T6 | T2 | T7 | T5 |
| Decode (D) | | | | T0 | T3 | T6 | T2 | T7 |
| Execute (E) | | | | | T0 | T3 | T6 | T2 |
| Memory (M) | | | | | | T0 | T3 | T6 |
| Bypass (B) | | | | | | | T0 | T3 |
| Writeback (W) | | | | | | | | T0 |
| Execution cycle | 0 | 1 | 2 | 3 | 4 | 5 | 6 | 7 |

FIG. 3

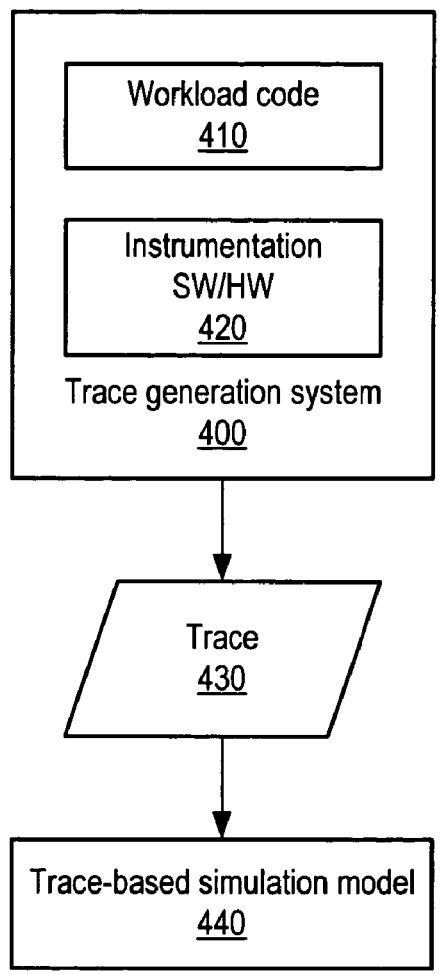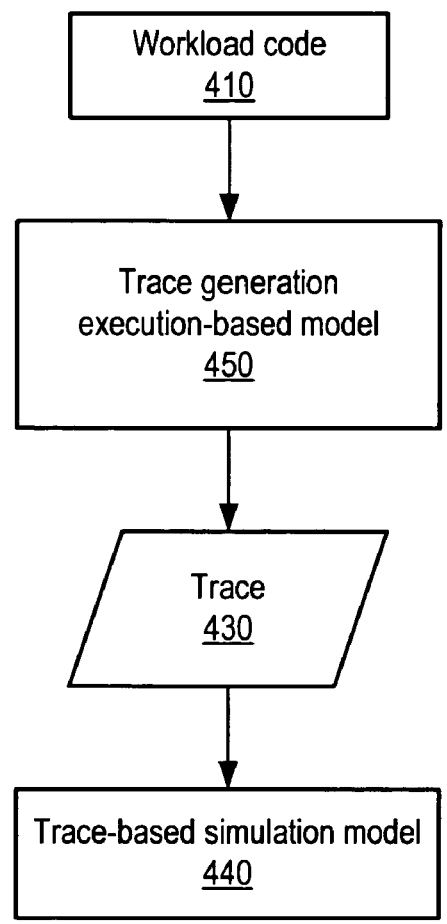
FIG. 4A                    FIG. 4B

METHOD AND SYSTEM FOR TRACE GENERATION USING MEMORY INDEX HASHING

BACKGROUND OF THE INVENTION

1. Field of the Invention

This invention relates to processor simulation and modeling techniques and, more particularly, to generation of instruction traces for processor simulation.

2. Description of the Related Art

As processor designs become increasingly complex, various types of pre-manufacturing simulation and modeling play more significant roles in design success. For example, the overall performance of a given processor typically depends on its microarchitectural configuration, but different design solutions may have significantly different effects on processor performance and design complexity. Thus, performance simulation to assess the relative merits of various microarchitectural configurations prior to investment in substantial design effort may result in improved overall performance of the resulting processor, depending on the quality and comprehensiveness of such performance simulation relative to the workloads actually presented to the resulting processor.

Once high-level features of a given processor implementation have been chosen and the implementation process begins, further simulation may be used to ensure that the processor satisfies functional and performance expectations. For example, verification tests may be performed on representations or models of the processor to ascertain whether the model is functionally correct (e.g., produces results in accordance with the defined behavior of the processor's architecture). Similarly, performance tests may be performed on processor models to determine whether the model produces correct results at a level predicted by earlier microarchitectural performance simulation.

Processors are becoming increasingly capable of parallel execution of different threads of instructions, for example via multithreaded and/or multicore designs. As a result, accurate simulation of such processors depends on workloads that fully exercise the processing resources of the design. For example, a processor under design may be configured to support four independent threads of concurrent processing activity.

However, if such a processor were simulated using only two threads of processing activity as a test workload, important effects of the design under a full workload may be overlooked (e.g., whether a shared cache can support four concurrently-executing threads without starving or stalling one or more threads).

Generating workloads that reflect large degrees of thread-level parallelism for use in simulation may present numerous challenges, however. In some embodiments, the execution behavior of a real system may be captured, appropriately modified and used as a workload or stimulus for model-based simulation. However, in some instances, no real system may exist that utilizes a degree of parallelism of a processor under development.

In other embodiments, an appropriate workload may be generated through another simulation process. However, the performance of simulation is typically far lower than the performance of actual system hardware, and this difference is exacerbated by the level of parallelism for which the simulation is configured. Thus, while a simulator may be configured to generate workloads having an arbitrary degree of thread-level parallelism, the amount of simulation time required to generate such workloads may severely limit the utility of this approach. Further, simply duplicating threads of existing traces to increase the overall parallelism of the trace may introduce artifacts that significantly distort the execution behavior of the trace.

SUMMARY

Various embodiments of a method and system for trace generation using memory index hashing are disclosed. According to one embodiment, a method may include generating an extended instruction trace representative of M distinct threads of instruction execution from an instruction trace representative of N distinct threads of instruction execution, where N is an integer greater than or equal to 1 and M is an integer greater than N, and where each of the N distinct threads of the instruction trace includes memory references to respective memory addresses. Generating the extended instruction trace from the instruction trace may include replicating the N distinct threads to generate the M distinct threads, assigning a respective unique identifier to each of the M distinct threads, and, for at least some of the memory references, hashing a first portion of each of the respective memory addresses dependent upon the respective unique identifier of the given one of the M distinct threads, where the first portion of each of the respective memory addresses corresponds to at least part of an index of a memory structure shared by at least two of the M distinct threads.

BRIEF DESCRIPTION OF THE DRAWINGS

FIG. 3 is a pipeline diagram illustrating the flow of instructions through one embodiment of a processor core.

FIGS. 4A-B are a block diagram illustrating various embodiments of approaches for generating instruction traces reflective of execution of computational workloads.

Figure 1:
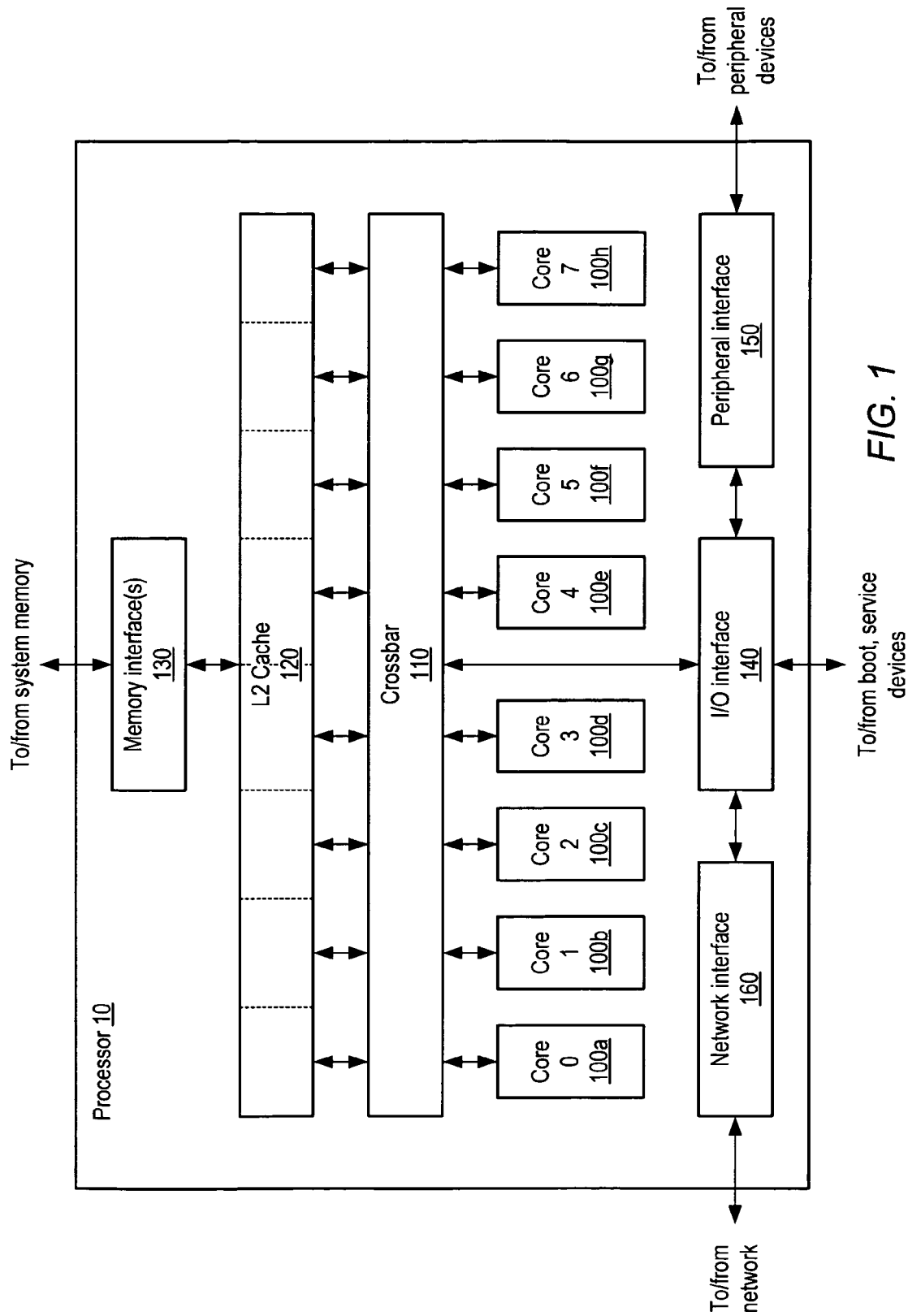
FIG. 1 is a block diagram illustrating one embodiment of a multithreaded processor.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS

Introduction

In the following discussion, an embodiment of a multi-threaded processor and its various features are first discussed in detail. Subsequently, simulation and modeling techniques that may be employed in the design of such a processor are discussed, followed by a description of various techniques for generation of instruction traces for use in such simulation. The technique of generating an extended trace from another trace through thread replication is introduced, and the problem of artifacts resulting from such replication is described. Finally, a method for mitigating such artifacts and a system for executing such a technique are discussed.

Overview of Multithreaded Processor Architecture

A block diagram illustrating one embodiment of a multithreaded processor 10 is shown in FIG. 1. In the illustrated embodiment, processor 10 includes a plurality of processor cores 100a-h, which are also designated "core 0" though "core 7". Each of cores 100 is coupled to an L2 cache 120 via a crossbar 110. L2 cache 120 is coupled to one or more memory interface(s) 130, which are coupled in turn to one or more banks of system memory (not shown). Additionally, crossbar 110 couples cores 100 to input/output (I/O) interface 140, which is in turn coupled to a peripheral interface 150 and a network interface 160. As described in greater detail below, I/O interface 140, peripheral interface 150 and network interface 160 may respectively couple processor 10 to boot and/or service devices, peripheral devices, and a network. In one embodiment, processor 10 may be implemented as a single integrated circuit.

Cores 100 may be configured to execute instructions and to process data according to a particular instruction set architecture (ISA). In one embodiment, cores 100 may be configured to implement the SPARC® V9 ISA, although in other embodiments it is contemplated that any desired ISA may be employed, such as x86, PowerPC® or MIPS®, for example. In the illustrated embodiment, each of cores 100 may be configured to operate independently of the others, such that all cores 100 may execute in parallel. Additionally, as described below in conjunction with the descriptions of FIG. 2 and FIG. 3, in some embodiments each of cores 100 may be configured to execute multiple threads concurrently, where a given thread may include a set of instructions that may execute independently of instructions from another thread. (For example, an individual software process, such as an application, may consist of one or more threads that may be scheduled for execution by an operating system.) Such a core 100 may also be referred to as a multithreaded (MT) core. In one embodiment, each of cores 100 may be configured to concurrently execute instructions from eight threads, for a total of 64 threads concurrently executing across processor 10. However, in other embodiments it is contemplated that other numbers of cores 100 may be provided, and that cores 100 may concurrently process different numbers of threads. For example, in various embodiments more or fewer than eight cores 100 may be provided, and some cores 100 may be configured to concurrently process eight or more threads while other cores 100 may be configured to concurrently process eight or fewer threads.

Crossbar 110 may be configured to manage data flow between cores 100 and the shared L2 cache 120. In one embodiment, crossbar 110 may include logic (such as multiplexers or a switch fabric, for example) that allows any core 100 to access any bank of L2 cache 120, and that conversely allows data to be returned from any L2 bank to any core 100. Crossbar 110 may be configured to concurrently process data requests from cores 100 to L2 cache 120 as well as data responses from L2 cache 120 to cores 100. In some embodiments, crossbar 110 may include logic to queue data requests and/or responses, such that requests and responses may not block other activity while waiting for service. Additionally, in one embodiment crossbar 110 may be configured to arbitrate conflicts that may occur when multiple cores 100 attempt to access a single bank of L2 cache 120 or vice versa.

L2 cache 120 may be configured to cache instructions and data for use by cores 100. In the illustrated embodiment, L2 cache 120 may be organized into eight separately addressable banks that may each be independently accessed, such that in the absence of conflicts, each bank may concurrently return data to a respective core 100. In some embodiments, each individual bank may be implemented using set-associative or direct-mapped techniques. For example, in one embodiment, L2 cache 120 may be a 4 megabyte (MB) cache, where each 512 kilobyte (KB) bank is 16-way set associative with a 64-byte line size, although other cache sizes and geometries are possible and contemplated. L2 cache 120 may be implemented in some embodiments as a writeback cache in which written (dirty) data may not be written to system memory until a corresponding cache line is evicted.

In some embodiments, L2 cache 120 may implement queues for requests arriving from and results to be sent to crossbar 110. Additionally, in some embodiments L2 cache 120 may implement a fill buffer configured to store fill data arriving from memory interface 130, a writeback buffer configured to store dirty evicted data to be written to memory, and/or a miss buffer configured to store L2 cache accesses that cannot be processed as simple cache hits (e.g., L2 cache misses, cache accesses matching older misses, accesses such as atomic operations that may require multiple cache accesses, etc.). L2 cache 120 may variously be implemented as single-ported or multiported (e.g., capable of processing multiple concurrent read and/or write accesses). In either case, L2 cache 120 may implement arbitration logic to prioritize cache access among various cache read and write requesters.

Memory interface 130 may be configured to manage the transfer of data between L2 cache 120 and system memory, for example in response to L2 fill requests and data evictions. In some embodiments, multiple instances of memory interface 130 may be implemented, with each instance configured to control a respective bank of system memory. Memory interface 130 may be configured to interface to any suitable type of system memory, such as Fully Buffered Dual Inline Memory Module (FBDIMM), Double Data Rate or Double Data Rate 2 Synchronous Dynamic Random Access Memory (DDR/DDR2 SDRAM), or Rambus® DRAM (RDRAM®), for example. In some embodiments, memory interface 130 may be configured to support interfacing to multiple different types of system memory.

In the illustrated embodiment, processor 10 may also be configured to receive data from sources other than system memory. I/O interface 140 may be configured to provide a central interface for such sources to exchange data with cores 100 and/or L2 cache 120 via crossbar 110. In some embodiments, I/O interface 140 may be configured to coordinate Direct Memory Access (DMA) transfers of data between network interface 160 or peripheral interface 150 and system memory via memory interface 130. In addition to coordinating access between crossbar 110 and other interface logic, in one embodiment I/O interface 140 may be configured to couple processor 10 to external boot and/or service devices. For example, initialization and startup of processor 10 may be controlled by an external device (such as, e.g., a Field Programmable Gate Array (FPGA)) that may be configured to provide an implementation- or system-specific sequence of boot instructions and data. Such a boot sequence may, for example, coordinate reset testing, initialization of peripheral devices and initial execution of processor 10, before the boot process proceeds to load data from a disk or network device.

Additionally, in some embodiments such an external device may be configured to place processor 10 in a debug, diagnostic, or other type of service mode upon request.

Peripheral interface 150 may be configured to coordinate data transfer between processor 10 and one or more peripheral devices. Such peripheral devices may include, without limitation, storage devices (e.g., magnetic or optical media-based storage devices including hard drives, tape drives, CD drives, DVD drives, etc.), display devices (e.g., graphics subsystems), multimedia devices (e.g., audio processing subsystems), or any other suitable type of peripheral device. In one embodiment, peripheral interface 150 may implement one or more instances of an interface such as Peripheral Component Interface Express (PCI Express™), although it is contemplated that any suitable interface standard or combination of standards may be employed. For example, in some embodiments peripheral interface 150 may be configured to implement a version of Universal Serial Bus (USB) protocol or IEEEE 1394 (Firewire®) protocol in addition to or instead of PCI Express™.

Network interface 160 may be configured to coordinate data transfer between processor 10 and one or more devices (e.g., other computer systems) coupled to processor 10 via a network. In one embodiment, network interface 160 may be configured to perform the data processing necessary to implement an Ethernet (IEEE 802.3) networking standard such as Gigabit Ethernet or 10-Gigabit Ethernet, for example, although it is contemplated that any suitable networking standard may be implemented. In some embodiments, network interface 160 may be configured to implement multiple discrete network interface ports.

Overview of Fine-grained Multithreading Processor Core

As mentioned above, in one embodiment each of cores 100 may be configured for multithreaded execution. More specifically, in one embodiment each of cores 100 may be configured to perform fine-grained multithreading, in which each core may select instructions to execute from among a pool of instructions corresponding to multiple threads, such that instructions from different threads may be scheduled to execute adjacently. For example, in a pipelined embodiment of core 100 employing fine-grained multithreading, instructions from different threads may occupy adjacent pipeline stages, such that instructions from several threads may be in various stages of execution during a given core processing cycle.

Figure 2:
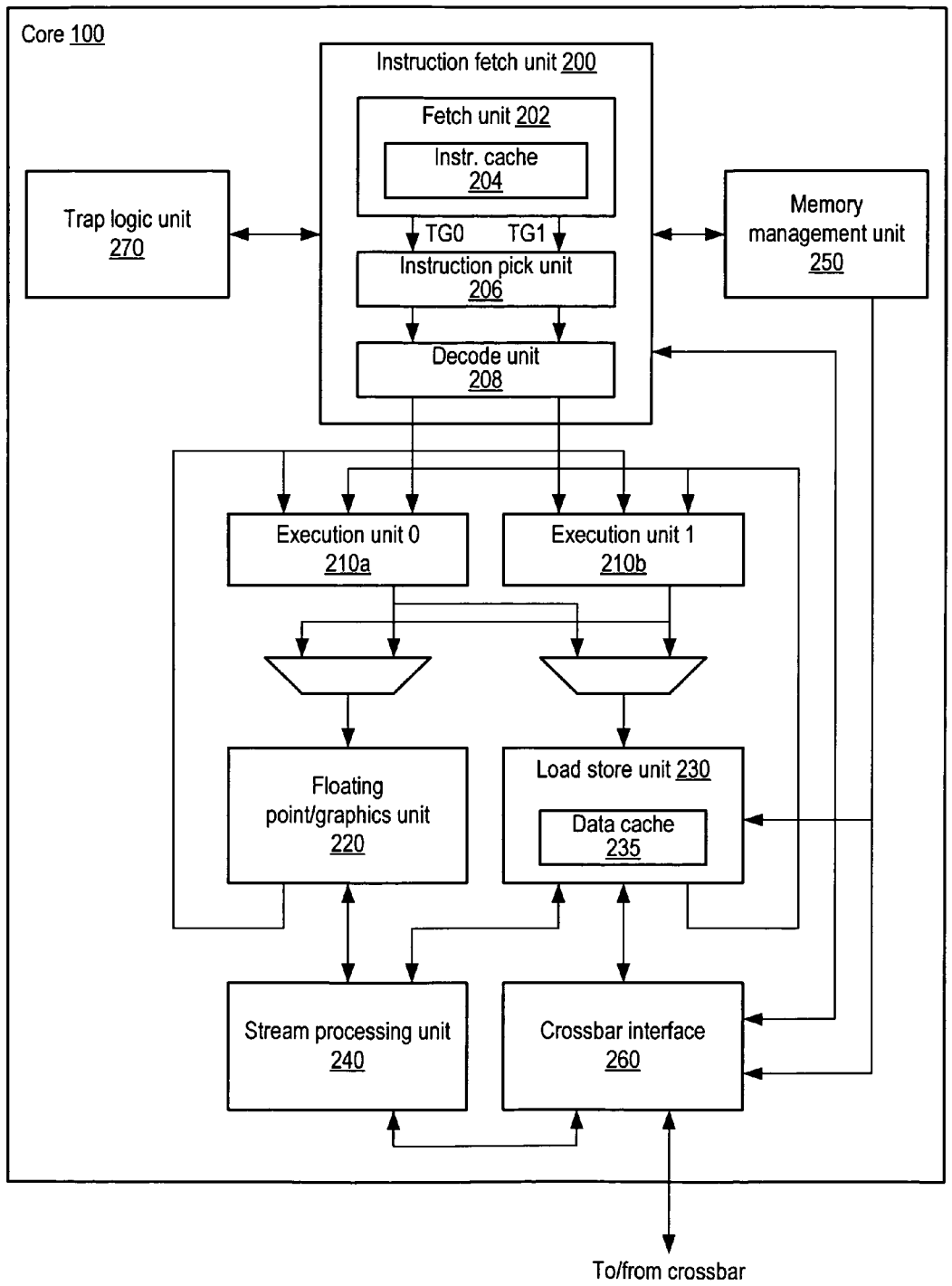
FIG. 2 is a block diagram illustrating one embodiment of a processor core configured to perform fine-grained multithreading.

One embodiment of core 100 configured to perform fine-grained multithreading is illustrated in FIG. 2. In the illustrated embodiment, core 100 includes an instruction fetch unit (IFU) 200 coupled to a memory management unit (MMU) 250, a crossbar interface 260, a trap logic unit (TLU) 270, and a plurality of execution units (EXU0, EXU1) 210*a-b*. (Execution units 210*a-b* may also be referred to generically as EXUs 210.) Each of execution units 210*a-b* is coupled to both a floating point/graphics unit (FGU) 220 and a load store unit (LSU) 230. Each of the latter units is also coupled to send data back to each of execution units 210*a-b*. Both FGU 220 and LSU 230 are coupled to a stream processing unit (SPU) 240. Additionally, LSU 230, SPU 240 and MMU 250 are coupled to crossbar interface 260, which is in turn coupled to crossbar 110 shown in FIG. 1.

Instruction fetch unit 200 may be configured to provide instructions to the rest of core 100 for execution. In the illustrated embodiment, IFU 200 includes a fetch unit 202, an instruction pick unit 206, and a decode unit 208. Fetch unit 202 further includes an instruction cache 204. In one embodiment, fetch unit 202 may include logic to maintain fetch addresses (e.g., derived from program counters) corresponding to each thread being executed by core 100, and to coordinate the retrieval of instructions from instruction cache 204 according to those fetch addresses. In some embodiments, instruction cache 202 may include fewer access ports than the number of threads executable on core 100, in which case fetch unit 202 may implement arbitration logic configured to select one or more threads for instruction fetch during a given execution cycle. For example, fetch unit 202 may implement a least-recently-fetched algorithm to select a thread to fetch. Fetch unit 202 may also implement logic to handle instruction cache misses and translation of virtual instruction fetch addresses to physical addresses (e.g., fetch unit 202 may include an Instruction Translation Lookaside Buffer (ITLB)). Additionally, in some embodiments fetch unit 202 may include logic to predict branch outcomes and/or fetch target addresses, such as a Branch History Table (BHT), Branch Target Buffer (BTB), or other suitable structure, for example.

In one embodiment, fetch unit 202 may be configured to maintain a pool of fetched, ready-for-issue instructions drawn from among each of the threads being executed by core 100. For example, fetch unit 202 may implement a respective instruction buffer corresponding to each thread in which several recently-fetched instructions from the corresponding thread may be stored. In one embodiment, instruction pick unit 206 may be configured to select one or more instructions to be decoded and issued to execution units 210. In the illustrated embodiment, the threads fetched by fetch unit 202 may be divided into two thread groups denoted TG0 and TG1 (for example, if core 100 implements eight threads, each of TG0 and TG1 may include four threads).

Pick unit 206, in the illustrated embodiment, may be configured to attempt to select one instruction to schedule for execution from each of TG0 and TG1, such that two instructions may be selected for execution during a given execution cycle. For example, pick unit 206 may employ a least-recently-picked (LRP) algorithm in which the least recently picked thread within a given thread group that is ready for execution is selected. It is noted that in one embodiment, thread fetching as performed by fetch unit 202 and instruction selection as performed by pick unit 206 may be largely independent of one another. In some embodiments, pick unit 206 may schedule instructions before all factors affecting instruction scheduling are known (e.g., instruction dependencies, implementation-specific resource hazards, etc.), in which case a picked instruction may be canceled at a later execution stage. In other embodiments, it is contemplated that other instruction selection algorithms may be employed, including algorithms that take additional instruction scheduling factors into account. Further, it is contemplated that in some embodiments, pick unit 206 may be configured to select more than two instructions for execution in a given execution cycle, or may select instructions from all threads rather than specific groups of threads. Additionally, in one embodiment pick unit 206 may be configured to identify source operand dependencies that a given picked instruction may have on a previously issued instruction, and may configure other logic to appropriately select source operands (e.g., from a register file, or from a previous execution cycle via bypass logic).

Decode unit 208 may be configured to further prepare instructions selected by pick unit 206 for execution. In the illustrated embodiment, decode unit 208 may be configured to identify the specific type of a given instruction, such as whether the instruction is an integer, floating point, load/store, or other type of instruction, as well as to identify operands required by the given instruction. Additionally, in one embodiment decode unit 208 may be configured to detect and respond to scheduling hazards not detected during operation of pick unit 206. For example, in the illustrated embodiment, only one load store unit 230 is provided. Consequently, if two load/store-type instructions were picked for execution, decode unit 208 may be configured to cancel or stall one of those instructions and allow the other to be issued. In such an embodiment, decode unit 208 may employ an arbitration algorithm to determine which instruction to issue without favoring a particular thread or thread group. Numerous other types of scheduling and resource hazards detectable by decode unit 208 are possible and contemplated.

In some embodiments, instructions from a given thread may be speculatively issued from decode unit 208 for execution. For example, a given instruction from a certain thread may fall in the shadow of a conditional branch instruction from that same thread that was predicted to be taken or not-taken, or a load instruction from that same thread that was predicted to hit in data cache 235, but for which the actual outcome has not yet been determined. In such embodiments, after receiving notice of a misspeculation such as a branch misprediction or a load miss, IFU 200 may be configured to cancel misspeculated instructions from a given thread as well as issued instructions from the given thread that are dependent on or subsequent to the misspeculated instruction, and to redirect instruction fetch appropriately.

Execution units 210a-b may be configured to execute and provide results for certain types of instructions issued from IFU 200. In one embodiment, each of EXUs 210 may be similarly or identically configured to execute certain integer-type instructions defined in the implemented ISA, such as arithmetic, logical, and shift instructions. In the illustrated embodiment, EXU0 210a may be configured to execute integer instructions issued from TG0, while EXU1 210b may be configured to execute integer instructions issued from TG1. Further, each of EXUs 210 may include an integer register file configured to store register state information for all threads in its respective thread group. For example, if core 100 implements eight threads 0-7 where threads 0-3 are bound to TG0 and threads 4-7 are bound to TG1, EXU0 210a may store integer register state for each of threads 0-3 while EXU1 210b may store integer register state for each of threads 4-7. It is contemplated that in some embodiments, core 100 may include more or fewer than two EXUs 210, and EXUs 210 may or may not be symmetric in functionality. Also, in some embodiments EXUs 210 may not be bound to specific thread groups or may be differently bound than just described. Finally, in the illustrated embodiment instructions destined for FGU 220 or LSU 230 pass through one of EXUs 210. However, in alternative embodiments it is contemplated that such instructions may be issued directly from IFU 200 to their respective units without passing through one of EXUs 210.

Floating point/graphics unit 220 may be configured to execute and provide results for certain floating-point and graphics-oriented instructions defined in the implemented ISA. For example, in one embodiment FGU 220 may implement single-and double-precision floating-point arithmetic instructions compliant with a version of the Institute of Electrical and Electronics Engineers (IEEE) 754 Standard for Binary Floating-Point Arithmetic (more simply referred to as the IEEE 754 standard), such as add, subtract, multiply, divide, and certain transcendental functions. Also, in one embodiment FGU 220 may implement partitioned-arithmetic and graphics-oriented instructions defined by a version of the SPARC® Visual Instruction Set (VIS™) architecture, such as VIS™ 2.0. Additionally, in one embodiment FGU 220 may implement certain integer instructions such as integer multiply, divide, and population count instructions, and may be configured to perform multiplication operations on behalf of stream processing unit 240. Depending on the implementation of FGU 220, some instructions (e.g., some transcendental or extended-precision instructions) or instruction operand or result scenarios (e.g., certain denormal operands or expected results) may be trapped and handled or emulated by software.

In the illustrated embodiment, FGU 220 may be configured to store floating-point register state information for each thread in a floating-point register file. In one embodiment, FGU 220 may implement separate execution pipelines for floating point add/multiply, divide/square root, and graphics operations, while in other embodiments the instructions implemented by FGU 220 may be differently partitioned. In various embodiments, instructions implemented by FGU 220 may be fully pipelined (i.e., FGU 220 may be capable of starting one new instruction per execution cycle), partially pipelined, or may block issue until complete, depending on the instruction type. For example, in one embodiment floating-point add operations may be fully pipelined, while floating-point divide operations may block other divide/square root operations until completed.

Load store unit 230 may be configured to process data memory references, such as integer and floating-point load and store instructions as well as memory requests that may originate from stream processing unit 240. In some embodiments, LSU 230 may also be configured to assist in the processing of instruction cache 204 misses originating from IFU 200. LSU 230 may include a data cache 235 as well as logic configured to detect cache misses and to responsively request data from L2 cache 120 via crossbar interface 260. In one embodiment, data cache 235 may be configured as a write-through cache in which all stores are written to L2 cache 120 regardless of whether they hit in data cache 235; in some such embodiments, stores that miss in data cache 235 may cause an entry corresponding to the store data to be allocated within the cache. In other embodiments, data cache 235 may be implemented as a write-back cache.

In one embodiment, LSU 230 may include a miss queue configured to store records of pending memory accesses that have missed in data cache 235 such that additional memory accesses targeting memory addresses for which a miss is pending may not generate additional L2 cache request traffic. In the illustrated embodiment, address generation for a load/store instruction may be performed by one of EXUs 210. Depending on the addressing mode specified by the instruction, one of EXUs 210 may perform arithmetic (such as adding an index value to a base value, for example) to yield the desired address. Additionally, in some embodiments LSU 230 may include logic configured to translate virtual data addresses generated by EXUs 210 to physical addresses, such as a Data Translation Lookaside Buffer (DTLB).

Stream processing unit 240 may be configured to implement one or more specific data processing algorithms in hardware. For example, SPU 240 may include logic configured to support encryption/decryption algorithms such as Advanced Encryption Standard (AES), Data Encryption Standard/Triple Data Encryption Standard (DES/3DES), or Ron's Code #4 (RC4). SPU 240 may also include logic to implement hash or checksum algorithms such as Secure Hash Algorithm (SHA-1, SHA-256), Message Digest 5 (MD5), or Cyclic Redundancy Checksum (CRC). SPU 240 may also be configured to implement modular arithmetic such as modular multiplication, reduction and exponentiation. In one embodiment, SPU 240 may be configured to utilize the multiply array included in FGU 220 for modular multiplication. In various embodiments, SPU 240 may implement several of the aforementioned algorithms as well as other algorithms not specifically described.

SPU 240 may be configured to execute as a coprocessor independent of integer or floating-point instruction issue or execution. For example, in one embodiment SPU 240 may be configured to receive operations and operands via control registers accessible via software; in the illustrated embodiment SPU 240 may access such control registers via LSU 230. In such embodiments, SPU 240 may be indirectly programmed or configured by instructions issued from IFU 200, such as instructions to read or write control registers. However, even if indirectly programmed by such instructions, SPU 240 may execute independently without further interlock or coordination with IFU 200. In another embodiment SPU 240 may receive operations (e.g., instructions) and operands decoded and issued from the instruction stream by IFU 200, and may execute in response to such operations. That is, in such an embodiment SPU 240 may be configured as an additional functional unit schedulable from the instruction stream, rather than as an independent coprocessor.

In some embodiments, SPU 240 may be configured to freely schedule operations across its various algorithmic sub-units independent of other functional unit activity. Additionally, SPU 240 may be configured to generate memory load and store activity, for example to system memory 810 described below. In the illustrated embodiment, SPU 240 may interact directly with crossbar interface 260 for such memory activity, while in other embodiments SPU 240 may coordinate memory activity through LSU 230. In one embodiment, software may poll SPU 240 through one or more control registers to determine result status and to retrieve ready results, for example by accessing additional control registers. In other embodiments, FGU 220, LSU 230 or other logic may be configured to poll SPU 240 at intervals to determine whether it has ready results to write back. In still other embodiments, SPU 240 may be configured to generate a trap when a result is ready, to allow software to coordinate result retrieval and processing.

As previously described, instruction and data memory accesses may involve translating virtual addresses to physical addresses. In one embodiment, such translation may occur on a page level of granularity, where a certain number of address bits comprise an offset into a given page of addresses, and the remaining address bits comprise a page number. For example, in an embodiment employing 4 MB pages, a 64-bit virtual address and a 40-bit physical address, 22 address bits (corresponding to 4 MB of address space, and typically the least significant address bits) may constitute the page offset. The remaining 42 bits of the virtual address may correspond to the virtual page number of that address, and the remaining 18 bits of the physical address may correspond to the physical page number of that address. In such an embodiment, virtual to physical address translation may occur by mapping a virtual page number to a particular physical page number, leaving the page offset unmodified.

Such translation mappings may be stored in an ITLB or a DTLB for rapid translation of virtual addresses during lookup of instruction cache 204 or data cache 235. In the event no translation for a given virtual page number is found in the appropriate TLB, memory management unit 250 may be configured to provide a translation. In one embodiment, MMU 250 may be configured to manage one or more translation tables stored in system memory and to traverse such tables (which in some embodiments may be hierarchically organized) in response to a request for an address translation, such as from an ITLB or DTLB miss. (Such a traversal may also be referred to as a page table walk.) In some embodiments, if MMU 250 is unable to derive a valid address translation, for example if one of the memory pages including a necessary page table is not resident in physical memory (i.e., a page miss), MMU 250 may be configured to generate a trap to allow a memory management software routine to handle the translation. It is contemplated that in various embodiments, any desirable page size may be employed. Further, in some embodiments multiple page sizes may be concurrently supported.

A number of functional units in the illustrated embodiment of core 100 may be configured to generate off-core memory or I/O requests. For example, IFU 200 or LSU 230 may generate access requests to L2 cache 120 in response to their respective cache misses. SPU 240 may be configured to generate its own load and store requests independent of LSU 230, and MMU 250 may be configured to generate memory requests while executing a page table walk. Other types of off-core access requests are possible and contemplated. In the illustrated embodiment, crossbar interface 260 may be configured to provide a centralized interface to the port of crossbar 110 associated with a particular core 100, on behalf of the various functional units that may generate accesses that traverse crossbar 110. In one embodiment, crossbar interface 260 may be configured to maintain queues of pending crossbar requests and to arbitrate among pending requests to determine which request or requests may be conveyed to crossbar 110 during a given execution cycle. For example, crossbar interface 260 may implement a least-recently-used or other algorithm to arbitrate among crossbar requestors. In one embodiment, crossbar interface 260 may also be configured to receive data returned via crossbar 110, such as from L2 cache 120 or I/O interface 140, and to direct such data to the appropriate functional unit (e.g., data cache 235 for a data cache fill due to miss). In other embodiments, data returning from crossbar 110 may be processed externally to crossbar interface 260.

During the course of operation of some embodiments of core 100, exceptional events may occur. For example, an instruction from a given thread that is picked for execution by pick unit 206 may not be a valid instruction for the ISA implemented by core 100 (e.g., the instruction may have an illegal opcode), a floating-point instruction may produce a result that requires further processing in software, MMU 250 may not be able to complete a page table walk due to a page miss, a hardware error (such as uncorrectable data corruption in a cache or register file) may be detected, or any of numerous other possible architecturally-defined or implementation-specific exceptional events may occur. In one embodiment, trap logic unit 270 may be configured to manage the handling of such events. For example, TLU 270 may be configured to receive notification of an exceptional event occurring during execution of a particular thread, and to cause execution control of that thread to vector to a supervisor-mode software handler (i.e., a trap handler) corresponding to the detected event. Such handlers may include, for example, an illegal opcode trap handler configured to return an error status indication to an application associated with the trapping thread and possibly terminate the application, a floating-point trap handler configured to fix up an inexact result, etc.

In one embodiment, TLU 270 may be configured to flush all instructions from the trapping thread from any stage of processing within core 100, without disrupting the execution of other, non-trapping threads. In some embodiments, when a specific instruction from a given thread causes a trap (as opposed to a trap-causing condition independent of instruction execution, such as a hardware interrupt request), TLU

270 may implement such traps as precise traps. That is, TLU 270 may ensure that all instructions from the given thread that occur before the trapping instruction (in program order) complete and update architectural state, while no instructions from the given thread that occur after the trapping instruction (in program order) complete or update architectural state.

Exemplary Core Pipeline Diagram

In the illustrated embodiment, core 100 may be configured for pipelined execution, in which processing of new instructions may begin before older instructions have completed, such that multiple instructions from various threads may be in various stages of processing during a given core execution cycle. A pipeline diagram illustrating the flow of integer instructions through one embodiment of core 100 is shown in FIG. 3. In the illustrated embodiment, execution of integer instructions is divided into eight stages, denoted Fetch (F), Cache (C), Pick (P), Decode (D), Execute (E), Memory (M), Bypass (B), and Writeback (W). In other embodiments, it is contemplated that different numbers of pipe stages corresponding to different types of functionality may be employed. It is further contemplated that other pipelines of different structure and depth may be implemented for integer or other instructions. For example, floating-point instructions may execute in a longer pipeline than integer instructions.

The first four stages of the illustrated integer pipeline may generally correspond to the functioning of IFU 200. In one embodiment, during the Fetch stage, one or more threads to fetch may be selected, and instruction cache 204 may be accessed for the selected thread. During the Cache stage, fetch unit 202 may determine whether the access of the previous cycle hit or missed the cache. If the access hit, the instructions read from the cache may be stored in instruction buffers. During the Pick stage, pick unit 206 may be configured in one embodiment to select at most two instructions to issue, one for each thread group as described above. Source dependencies of the selected instructions on previously issued instructions may also be detected during the Pick stage. During the Decode stage, decode unit 208 may be configured to decode the selected instructions and to determine whether resource hazards exist as described above. For integer operations, data operands may also be selected during the Decode stage. For example, operands may be retrieved from an integer register file, or bypass logic may be configured to bypass operands from another pipe stage.

During the Execute stage, one or both of execution units 210 may be active to compute an instruction result. If an instruction in the integer execution pipeline is not a load or store instruction, in the illustrated embodiment it may be idle during the Memory and Bypass stages before its result is committed (i.e., written back to the integer register file) in the Writeback stage. A load or store instruction may have its address calculated by one of execution units 210 during the Execute stage. During the Memory stage of a load instruction, data cache 235 may be accessed, while during the Bypass stage, LSU 230 may determine whether a data cache hit or miss occurred. In the hit case, data may be forwarded to the appropriate execution unit 210 (e.g., dependent on the thread group of the load instruction) to be committed during the Writeback stage. In one embodiment, store instructions and load instructions that miss data cache 235 may execute with different pipeline timing than shown in FIG. 3.

In the illustrated embodiment, integer instructions are depicted as executing back-to-back in the pipeline without stalls. In execution cycles 0 through 7, instructions from threads 0, 3, 6, 2, 7, 5, 1 and 4 enter the Fetch stage, respectively, though in other embodiments, instructions may issue from various threads in a different order according to the operation of pick unit 206. In some instances, other instructions issued prior to execution cycle 0 may also be in the pipeline. Additionally, in some embodiments, two different instructions from the same or different threads may execute during the same pipeline stage. For example, in the illustrated embodiment of core 100, one integer instruction may be issued to each of execution units 210 in a single cycle.

By execution cycle 7, it is noted that each stage of the pipeline holds an instruction from a different thread in a different stage of execution, in contrast to conventional processor implementations that typically require a pipeline flush when switching between threads or processes. In some embodiments, flushes and stalls due to resource conflicts or other scheduling hazards may cause some pipeline stages to have no instruction during a given cycle. However, in the fine-grained multithreaded processor implementation employed by the illustrated embodiment of core 100, such flushes and stalls may be directed to a single thread in the pipeline, leaving other threads undisturbed. Additionally, even if one thread being processed by core 100 stalls for a significant length of time (for example, due to an L2 cache miss), instructions from another thread may be readily selected for issue, thus increasing overall thread processing throughput.

Model Simulation and Instruction Trace Generation

As can be appreciated from the foregoing discussion, in some embodiments a multithreaded processor implementation may support the concurrent processing of many distinct threads of execution, each of which may include instructions configured to independently execute. For example, different applications, operating system processes, subfunctions of applications or processes, or any other suitable computing task may be assigned to different respective threads for execution within processor 10.

During the course of designing a system configured for a high degree of multithreaded execution, such as processor 10 or a system including such a processor, it may be necessary or desirable to model or simulate various aspects of system operation. In one embodiment, a microarchitectural simulation model that represents features of processor 10 at a high level of abstraction may be employed to test the effects of adding, deleting or modifying the general behavior of functional components of processor 10. Typically, such a microarchitectural model may be configured to represent functional units of processor 10 and/or cores 100 as "black boxes," each of which may represent the general functional behavior, and possibly the general timing of a corresponding system component without necessarily reflecting much implementation detail for that component (though the level of implementation detail reflected in a microarchitectural model may vary by individual component, design style or the preference of the modeler). For example, in an abstract microarchitectural model, FGU 220 may be modeled as a functional unit configured to perform various floating-point arithmetic and other functions with appropriate timing characteristics, but without implementation detail such as the disaggregation of FGU 220 into discrete subunits.

Often, an abstract microarchitectural model may be employed to estimate the impact of different microarchitectural configurations on various system performance criteria, such as the latency of a particular processing task (e.g., in number of execution cycles), the overall processing throughput of the system, estimated power consumption, or other suitable criteria. For example, owing to its highly abstract and functional nature, a microarchitectural model may be readily reconfigured to test the effects of different cache geometries (e.g., reflecting cache size, cache set associativity, or other aspects of cache architecture), different execution resources (e.g., number of integer, floating point and/or load/store execution units), different pipeline lengths or any other microarchitectural feature of a complex processing system.

As design progresses, more detailed simulation models may also be constructed. For example, register transfer level (RTL) models that represent the functionality of combinational and sequential design elements may be used to represent the detailed logic design of functional units whose functionality was represented more abstractly in the microarchitectural model. Gate-level models may be used to represent a particular logic design at the level of logic gates. Such gates, for example, may be defined in a library and used by a logic synthesis tool as the basis for implementation of an RTL model. Switch-level models may be used to represent a gate-level design at the level of individual transistor or other devices through which the logic gates comprising the design may be implemented.

Different levels of design modeling may serve different purposes in the design process, dependent upon the level of abstraction of the model. Often, a microarchitectural model may be well suited to exploration of microarchitectural configuration spaces to optimize the selection and configuration of the overall functional resources of a system for its anticipated use. For example, a microarchitectural model may be readily altered to analyze the effects of changing cache organization. By contrast, a lower-level model may be well suited to analysis of timing and floorplanning issues relevant to physical implementation of the design. It is noted that a given design process need not utilize any particular level of modeling described above, and may use more, fewer and/or different levels of modeling than those described.

Often, design models at various levels of abstraction may be used to simulate the performance of a system or processor design. For example, models may be implemented via conventional software programming languages such as, e.g., C or C++, via modeling languages specifically developed for hardware modeling such as, e.g., Verilog™ RTL or VHDL™, or using other conventional or proprietary modeling techniques. In some design processes, certain models at lower levels of abstraction may be generated from models at higher levels of abstraction via the operation of a design tool or application. For example, a synthesis tool may be configured to transform a behavioral RTL model of a design into a gate-level model that is functionally equivalent to the RTL model.

Once implemented, a model may be configured to receive some sort of stimulus or input representative of test conditions, to process the stimulus, and to produce output representative of the behavior of the model with respect to the stimulus. In many cases of processor design, where the processor implements a particular ISA, it may be desirable for a model to support a stimulus that is formatted according to the particular ISA. For example, if a microarchitectural model of processor 10 were configured to receive as input an instruction stream representative of some software task, the process of modeling software behavior may be greatly simplified, as the instruction stream used for modeling may closely resemble the instruction stream produced for an actual processor implementation by a software compiler or another software development tool. Thus, software benchmarks or other applications for which modeling is desired may be input relatively directly into an appropriate model for simulation.

In some embodiments, a model of a complex processor system may reflect the real components such a system is likely to include, such as a processor, a system memory, input/output (I/O) devices, and/or other components. In some such embodiments, the operation of the system model may be initiated by locating the desired stimulus (e.g., encoded values representing instructions and data) within the portion of the system model corresponding to system memory, and causing the processor portion of the system model to begin fetching instructions of the stimulus for execution. However, simulation of system execution using such a comprehensive system model may often require extremely long model runtimes relative to the quantity of simulated code execution. For example, in many systems, the latency of accessing system memory may correspond to tens or hundreds of processor cycles. If the system model accurately represents the relative timing of system memory or I/O accesses with respect to processor execution, a large portion of the model's execution time may be devoted to modeling processor stall cycles, until sufficient portions of the stimulus code and data have been loaded into faster portions of the cache memory hierarchy. Beyond the impact of modeling memory hierarchy timing, execution-based modeling may involve considerable computational overhead, as there may be numerous entities and effects whose dynamic behavior is to be accounted for in the model. For example, an execution-based system model may attempt to model the behavior of I/O devices, the effect of operating systems and device drivers, and other system and software elements in addition to the behavior of the processor itself.

As an alternative to execution-based simulation, in some embodiments trace-based simulation may be used to provide a stimulus to a model for simulation. Generally speaking, in trace-based simulation, a detailed record of system operation under a workload may be generated and stored. The detailed record, or instruction trace, may then be used and reused as the stimulus for a simulation model that may be narrower in scope than the model or system originally used to generate the trace. For example, as described in detail below, an instruction trace may be generated that reflects the behavior of an entire system, including memory access behavior, I/O device behavior, application execution, operating system execution, traps, faults and/or other system behavior. Such a trace may then be used as the stimulus for a microarchitectural model of a particular system component, such as processor 10. In particular, the trace may be repeatedly used to test different microarchitectural configurations of processor 10, in order to ascertain the impact of such configurations on processor performance given the system configuration originally used to generate the trace.

It is noted that to the extent a system-related event is reflected in a trace, the effects of that event on the behavior of processor 10 may be observed without requiring the functionality driving the event to be modeled. For example, during operation of a system, a direct memory access (DMA) event may occur. In an execution-based simulation, various system components related to the DMA event (e.g., an I/O device, a DMA controller) may be modeled in some detail and dynamically evaluated during simulation. In a trace-based simulation, the occurrence of the DMA event and its effect on system state (e.g., the state of system memory) may be statically reflected in the trace contents without the corresponding simulation overhead of actually modeling the behavior of the related system components. Thus, for a given level of simulation computing resources, trace-based simulation may result in greater simulation throughput (e.g., simulation cycles per second) than execution-based simulation.

Instruction traces may include different types and quantities of information in different embodiments. Minimally, a trace may include a record of each instruction executed by the system (e.g., by processor 10) during execution of the trace workload. Such a record may include, for each instruction, an indication of the instruction as executed, such as the encoded instruction word or opcode of the instruction as it would be stored in memory prior to execution. The record may also include indications of any operands referenced by the instruction, such as register identifiers, load/store memory addresses, branch targets, immediate operands, or any other types of instruction operands. The record may further include an indication of the address associated with the instruction, such as the program counter address of the instruction. In some embodiments, an instruction trace may be representative of a number of distinct threads of instruction execution. In such embodiments, the trace may include additional information to distinguish the thread associated with a particular instruction, such as a unique thread or virtual processor identifier. For example, a virtual processor identifier associated with a thread may be uniquely constructed from an identifier of a processing core (e.g., core 100) within which the thread is executing and an identifier of the thread within the identified processing core.

In some embodiments, trace data may be encoded and stored in machine-readable form, such as binary or hexadecimal data organized according to a defined trace format. In other embodiments, an instruction trace may include human-readable versions of certain trace data. For example, to assist in analysis of the execution behavior represented by a trace, the trace may include instruction mnemonics, event names or other human-readable data corresponding to encoded instructions, system events or other encoded data represented within the trace. In other embodiments, a trace may not explicitly include human-readable data, but may be processed using an appropriate tool (e.g., a reverse assembler) to generate such data.

One embodiment of a simple trace for a fictional instruction set architecture is shown below.

| PC | Instr | Operands | Mem/Result |
|---|---|---|---|
| 0x5828a890 | 0x2908ae23 | 0x8b39567e | 0x0000100a ld R1, 0x8b39567e |
| 0x5828a894 | 0x5f8e1825 | 0x0000003b | 0x00001045 add R2, R1, 0x0000003b |
| 0x5828a898 | 0xa8feb190 | 0x18529258 | 0x00001045 st 0x18529258, R2 |

This trace reflects the execution of three instructions—a load instruction that loads a value from an address to a register R1, an add instruction that adds an immediate value to register R1 and stores the result in register R2, and a store instruction that stores the value of register R2 to an address—and indicates information related to those instructions in both hexadecimal and human-readable format. The first column indicates the program counter address of the corresponding instruction, which may be a virtual or physical address. The second column indicates the encoded instruction word corresponding to the instruction. The third column indicates operands of the instruction not reflected in the instruction word, such as immediate data. The fourth column indicates memory and/or result activity. For example, if the instruction resulted in data being read from or written to memory, this data may be reflected in the fourth column. In the absence of memory activity, the fourth column may indicate the data result produced by execution of the instruction, if any. While the illustrated trace is formatted as a table including distinct columns, it is noted that a trace may be formatted in any suitable fashion. For example, a trace may be stored as a collection of structured data records having data fields delimited according to a markup language, such as, e.g., a version of eXtensible Markup Language (XML).

Numerous other types of trace configurations are possible and contemplated. In some embodiments, traces may include information indicative of system events such as traps, exceptions, interrupts, DMA events or other events that may occur during the course of system operation. In other embodiments, traces may further include various degrees of system or processor state information. For example, a trace may reflect the state of processor data structures such as register files, translation lookaside buffers (TLBs), or other data structures, whether architecturally visible (e.g., visible to a programmer) or not. In various embodiments, processor state may be comprehensively indicated for each instruction, or indicated only for certain instructions or events (e.g., according to the type of instruction or event) or at intervals of instructions or events. Alternatively, only that processor state that is used and/or modified by a given instruction may be indicated within the trace for that instruction. It is noted that the specific types of information that may be included in a given trace may vary depending on the objectives and requirements of the model for which the trace serves as a stimulus. It is also noted that in various embodiments, memory references reflected in traces may correspond to virtual memory addresses, physical memory addresses, or both.

In various embodiments, a trace of a given computational workload may be generated through simulation or through execution of the workload on actual hardware. Exemplary embodiments of these approaches are illustrated in FIGS. 4A-B. In FIG. 4A, a trace generation system 400 is shown. Generally speaking, system 400 may correspond to any type of computer system having operational characteristics suitable for trace generation. Typically, system 400 may include at least one processor and a system memory configured to store executable instructions and data, as described in greater detail below in conjunction with the description of FIG. 7. System 400 may also be configured to implement the ISA to which the trace is targeted. For example, if a SPARC™, x86 or other type of instruction trace is desired, system 400 may respectively implement an appropriate version of the SPARC™, x86 or other ISA. In some cases, configuration of system 400 may depend on the desired characteristics for the trace to be generated. For example, if it is desired to generate a trace that reflects substantial DMA activity, system 400 may be provisioned with appropriate peripherals capable of performing the requisite DMA activity.

System 400 may be configured to directly execute program instructions and operate on data that implement workload code 410. For example, workload code 410 may correspond to a performance benchmark or application for which it is desired to generate an instruction trace. In some embodiments, system 400 may also implement other software configured to generate an environment for the execution of workload code 410. For example, system 400 may be configured to execute operating system code that itself is configured to implement a process or application environment for execution of workload code 410. Such operating system code may be configured to isolate application memory spaces from one another, control access to I/O devices, maintain virtual memory systems, or perform any other task typical of operating systems.

System 400 may also include instrumentation software and/or hardware 420 (or simply, instrumentation 420). Generally speaking, instrumentation 420 may be configured to monitor the operation of system 400 and collect data to be included within the generated trace. For example, instrumentation 420 may be configured to collect information about instruction execution, such as the address and encoded instruction word of each instruction executed during processing of workload code 410. Instrumentation 420 may also be configured to collect information related to memory traffic (e.g., data loads and stores, instruction fetches), traps, interrupts, or any other events or system state to be reflected in the generated state.

In various embodiments, instrumentation 420 may implement different techniques or combinations of techniques for collecting trace data. For example, instrumentation 420 may include an operating system or driver-level component configured to store a record of each instruction successfully executed by system 400. In some embodiments, instrumentation 420 may use system test features such as boundary scan techniques (e.g., as defined by the Joint Test Action Group (JTAG)/IEEE 1149 standard) to extract processor state following instruction execution, such as the state of register files or other processor data structures. Instrumentation 420 may include hardware such as logic analyzers or other test tools configured to monitor the state of observable signals or buses within system 400. For example, such hardware may be configured to exercise boundary scan interfaces to extract processor state or to monitor and collect memory and/or I/O bus traffic.

System 400 may be configured to execute workload 410 and, through the operation of instrumentation 420, collect trace 430. For example, trace 430 may be generated as a text, binary or other type of file stored in memory, on disk or on another type of storage medium internal or external to system 400. The generated trace 430 may then be used as an input to a trace-based simulation model 440. Model 440 may be executable on a system, such as system 400 or another system, to model certain functional aspects of a system or processor such as processor 10. For example, model 440 may be configured as a microarchitectural model, an RTL model, or any other suitable type of model as described above.

Capturing a trace from a hardware system, such as shown in FIG. 4A, may allow for the rapid generation of large traces. For example, system 400 may operate at a rate that is orders of magnitude faster than a software-based model of the same system. However, such direct trace capture may present its own challenges or limitations. For example, it may be difficult to implement instrumentation 420 to obtain the desired level of visibility into the details of system performance required for the desired level of trace detail. Moreover, in some circumstances a suitable hardware platform may simply not exist, for example if a trace of a new or extended ISA is to be generated, or if the effects of new system technologies such as memory or peripheral interfaces are to be reflected in the trace.

Thus, in an alternative embodiment, trace 430 may be generated through operation of an execution-based simulation model, as shown in FIG. 4B. In the illustrated embodiment, execution-based simulation model 450 may be configured to comprehensively model desired features of the system for which trace 440 is to be generated. For example, model 450 may be configured to model the behavior of one or more processors as well as system memory, peripherals and relevant interfaces. As described above, model 450 may be implemented at any of various levels of abstraction using any suitable general-purpose programming language or any specialized or proprietary modeling language. Model 450 may be executable on a system such as the one illustrated in FIG. 7, and it is noted that the features and ISA of the system modeled by model 450 may be completely divergent from the features and ISA of the system on which model 450 executes.

In the illustrated embodiment, model 450 may be configured to receive workload code 410 as an input. For example, model 450 may be configured to reflect the location of workload code 410 in a modeled portion of system memory, or to preload one or more caches of a modeled processor with portions of workload code 410. As described above with respect to FIG. 4A, in some embodiments workload code 410 may execute in an environment provided through the execution of operating system code. In some embodiments, model 450 may similarly be configured to model all or selected portions of operating system behavior relevant to workload code 410. For example, if a trap or interrupt occurs during the simulated execution of workload code 410, model 450 may be configured to execute the appropriate handler functionality as would be defined by an operating system.

Model 450 may be configured to generate trace 430 during the course of simulation of workload code 410. In some embodiments, model 450 may offer considerably greater visibility into the state of system components than an actual hardware system. For example, model 450 may maintain an internal data structure corresponding to each modeled state element of the system and may provide ready access to such data structures irrespective of whether they correspond to architecturally visible system elements. After being generated and stored, trace 430 may be provided as an input to model 440, as described above. In some embodiments, trace-based simulation model 440 may be configured as a simplified version of execution-based simulation model 450, while in other embodiments the two models may be implemented as distinct models with few or no components in common.

Generation of Extended Traces

In some embodiments, trace-based simulation model 440 may be configured as a model of a multithreaded processor, such as processor 10 described above. Correspondingly, it may be desirable for the generated trace 430 to reflect a workload that utilizes most or all of the thread processing capability of the modeled processor. For example, if model 440 represents an embodiment of processor 10 that is capable of executing 32 distinct threads of execution, it may be desirable to test model 440 with a trace 430 that similarly reflects 32 threads of execution, in order to fully stress processor resources that might exhibit different behavior under a lighter trace workload comprising fewer threads of execution (such as, e.g., caches, interfaces or other processor resources that may be shared by multiple threads).

However, generating a trace 430 that reflects numerous distinct threads of instruction execution may present difficulties, particularly as processors under development scale to ever-larger degrees of thread processing. As described above with respect to FIGS. 4A-B, a trace 430 may typically be generated by capturing the execution of a workload 410 on an actual system 400, or by simulating execution of the workload 410 using an execution-based simulation model 450. However, the desired number of threads for trace 430 may exceed the capabilities of existing systems 400. For example, if a 64-thread trace 430 is desired, but existing systems 400 are only capable of processing at most 32 threads, the desired 64-thread trace cannot be directly generated via the system-based approach. In principle, simulation model 450 may be configured to model an arbitrary number of threads of execution, and thus may be technically capable of generating a trace 430 with a given number of threads. However, as the number of modeled threads increases, the runtime of model 450 may increase accordingly, to the point where the amount of simulation time needed to generate the trace 430 is unacceptable.

In some embodiments, a given instruction trace 430 that represents N distinct threads of instruction execution, where N is an integer greater than or equal to 1, may be used as the basis for generating an extended instruction trace 430 that is representative of M distinct threads of instruction execution, where M is an integer greater than N. For example, the given instruction trace 430 may be generated via any suitable technique, such as described above. The N threads of instruction execution may then be replicated to correspond to the M threads of instruction execution of the extended trace 430. For example, if the given instruction trace 430 includes 8 threads of execution uniquely identified as threads 0-7, and the desired trace is to include 32 threads of execution uniquely identified as threads 0-31, the extended trace 430 may be generated by replicating each thread of the given instruction trace 430 four times, and associating the replicated threads with corresponding threads of the extended trace 430. The replication may implement any suitable correspondence between the threads of the given trace 430 and the extended trace 430. For example, threads 0-7 of the given trace 430 may be replicated to respectively correspond to threads 0-7, 8-5, 16-23 and 24-31 of the extended trace 430. Alternative groupings and interleaves of the replicated threads are possible and contemplated. It is noted that in some embodiments, aside from the number of threads reflected in the trace, extended trace 430 may be similar to given trace 430 in terms of the format and type of information included therein.

Replication of threads of a given trace 430 may facilitate the generation of an extended trace 430 reflecting the instruction execution behavior of a greater number of threads without actually simulating or executing the greater number of threads in execution-based model 450 or system 400, respectively. Such replication may improve the overall efficiency of generating traces with large degrees of thread parallelism.

However, it is possible for replication to introduce artifacts that may distort the execution behavior of extended trace 430 relative to a trace having the same number of threads, but generated without replication. For example, a thread of given trace 430 may include a load instruction located at program counter value X that accesses a data value located at memory address Y. If this thread is replicated T times to generate an extended trace 430, a simulation using the resulting extended trace may result in T instruction fetches to program counter value X and T memory accesses to memory address Y. However, in a realistic system, different threads of execution may frequently have different, independent address spaces for data and code. For example, an operating system memory manager may be configured to allocate different, nonoverlapping portions of a virtual memory address space to different threads, and may employ other techniques to segregate memory resources of different threads. While in some instances, portions of code or data memory may be deliberately shared among distinct threads of execution, unintentionally introducing such sharing as a result of thread replication may result in undesired simulation behavior. For example, if multiple threads attempt to write to the same cache memory location as a consequence of thread replication, contention for the memory resource may result in stall cycles, invalidation requests or other processor behaviors that would not have arisen if the multiple threads had not shared access to the cache memory location.

In some embodiments, memory address-related artifacts of thread replication within extended trace 430 may be reduced by manipulating memory address references within each replicated thread. For example, a respective offset value for a given replicated thread may be added to all memory address references within that thread, such that collective memory references of the replicated threads are "spread" across different portions of a memory address space. Alternatively, in some embodiments, the addresses of at least some memory references in each thread within extended trace 430 may be modified to reflect a respective unique identifier or replica ID corresponding to that thread. For example, in an embodiment of processor 10 including eight cores 100 supporting eight threads per core, a given thread identifier may be configured as a 6-bit number that uniquely identifies a particular core 100 and a particular thread within that core. Alternatively, the replica ID of a replicated thread may be some other unique value generated during the trace generation process that need not correspond directly to a thread identifier used within processor 10. It is noted that in various embodiments, either a thread identifier or a replica ID may be represented using any suitable number of bits, depending, for example, on the number of original or replicated threads contemplated to be supported, the encoding scheme employed to generate the identifier, whether other information is also encoded in the identifier, and/or other implementation considerations.

Once a replica ID is determined for a particular thread within extended trace 430, the replica ID may be inserted into a portion of the memory addresses of at least some of the memory references within the particular thread. In one embodiment, the replica ID may be inserted into a portion of the memory address that falls outside the range of the address space of the workload or application corresponding to the thread. For example, if extended trace 430 is targeted to a processor 10 having a 64-bit address space denoted address [63:0], but the code and data addresses of the workload reflected within extended trace 430 are confined to the lower 48 bits of the address space (e.g., address[47:0]), then the replica ID may be inserted into any of the unused upper bits of the address space (e.g., any of address[63:48]). While contiguous bits of the address space may be used for the replica ID, this is not necessary.

Thus, for example, if a reference to memory address 0x00000000397F194A occurs in a thread that is replicated eight times during generation of extended trace 430, and bits 63:56 of the address space are selected to store the replica ID, then in one embodiment, the corresponding memory references within the replicated traces will be, respectively, 0x10000000397F194A, 0x20000000397F194A, . . . , 0x70000000397F194A. It is noted that in this example, the replica ID may not correspond to the thread identifier. For example, if the original thread was identified as thread 0, the replicated threads may be identified within extended trace 430 as threads 8, 16, 24, . . . , 56.

Modifications to distribute the addresses of memory references of replicated traces over distinct portions of an address space, such as by inserting a replica ID or adding an appropriate offset to the addresses as described above or by using another suitable technique, may be effective to resolve certain artifacts of trace replication that result from unintentional sharing of memory addresses. For example, by rendering memory references in two replicas of the same thread literally distinct according to their replica IDs, the thread replicas will ultimately refer to different locations within virtual and/or physical memory.

However, some artifacts of thread replication may not be affected by the aforementioned techniques. In some embodiments, certain portions of a memory address may be used to index a memory structure that may be shared among multiple threads. For example, different threads may access the memory structure for corresponding memory references, which may correspond to completely distinct memory addresses. Even though the memory addresses of memory references from different threads may be distinct, however, certain portions of the memory address that are used to index the memory structure may have the same value for the memory references, which may result in false conflicts within the memory structure when threads are replicated, as described below.

Figure 5:
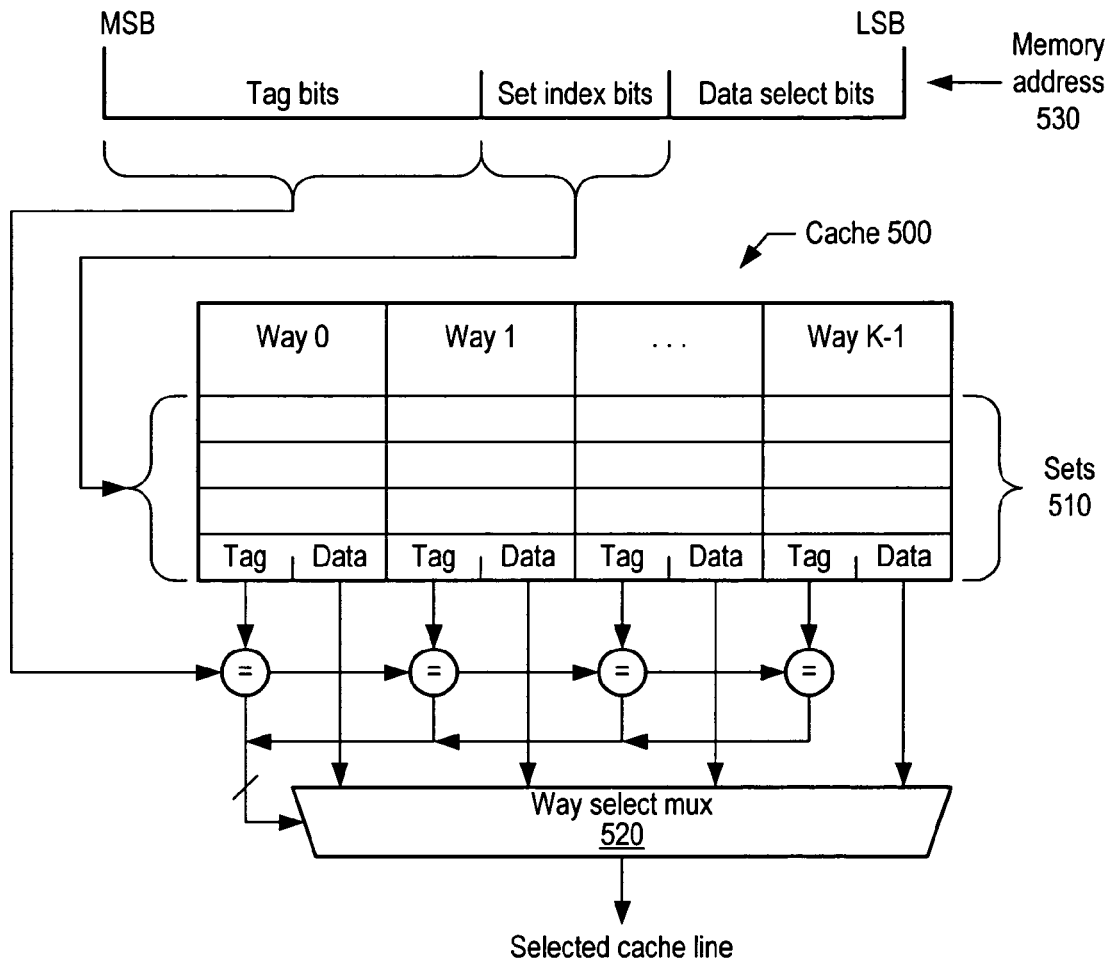
FIG. 5 is a block diagram illustrating one embodiment a memory structure that may be shared by different threads of instruction execution.

One example of such a memory structure is a cache memory that may be shared among threads, such as L2 cache 120 of processor 10 as described above, although it is contemplated that the potential for index-based conflicts may arise within many other types of shared memory structures regardless of their relative position within a memory hierarchy. One generalized embodiment of a cache that may be susceptible to index-based conflicts arising from thread replication is shown in FIG. 5. In the illustrated embodiment, cache 500 is configured as a set-associative cache including K ways denoted way 0 through way K-1. Cache 500 includes an arbitrary number of sets 510 distributed across the cache ways 0 through K-1. The intersection of a given way and a given set 510 may be referred to as a cache line. In the illustrated embodiment, each cache line is configured to store a cache tag as well as cache data, although it is noted that in some embodiments, tags and data may be stored in separate structures and accessed at different times during cache operation.

For a given memory reference such as a load or store operation, different portions of the memory address to the given memory reference may play different roles in the operation of cache 500. In the illustrated embodiment, memory address 530 may represent the address of any given memory reference. As shown, memory address 530 is divided into three distinct portions: a tag portion, a set index portion, and a data select portion. The numbers of address bits corresponding to each portion may vary according to the particular geometry of cache 500 (e.g., according to the number of sets and ways of cache 500 as well as the cache line size). Although not shown in FIG. 5, it is contemplated that in some embodiments cache 500 may be further subdivided into additional addressable portions such as banks, sub-banks or other entities, some of which may correspond to respective portions of address 530.

During typical operation of cache 500 for a given value of address 530, the set index portion of address 530 may be decoded to select a particular one of sets 510. For example, if there are $2^L$ total sets 510 defined within cache 500, then L bits of address 530 may be defined as the set index bits. These L bits may uniquely specify one of the $2^L$ sets 510. When a particular set 510 is selected, each tag value stored within the selected set 510 may be compared against the tag bits of address 530. If none of the stored tag values match the tag portion of address 530, data corresponding to the given value of address 530 may not exist within cache 500 and a cache miss may occur. By contrast, if one of the stored tag values matches the tag portion of address 530, a cache hit may occur, and the data corresponding to the matching stored tag value may be selected by way select mux 520. In some embodiments, a specific portion of the data may be further selected (e.g., within way select mux 520 or other selection logic) dependent upon the data select portion of address 530. Cache 500 may typically require that at most one instance of a given tag value be stored in any way of a given set 510, to ensure that a cache hit selects a unique way. However, in other embodiments, multiple-way hits may be allowed, and other criteria (e.g., a thread identifier or some other differentiating identifier) may be employed to determine what data should be selected.

As shown in FIG. 5, any given value of address 530 maps to a particular one of sets 510 that may store at most K different cache lines. If, during the course of cache operation, data is stored to more than K different addresses that map to a particular set 510, a conflict may occur. As a result, existing data stored in a selected way of the particular set 510 may be evicted to make room for new data, according to a cache replacement policy. For example, a least frequently or least recently used algorithm may be employed to select a cache way for replacement.

Conflicts may reduce cache performance. For example, if data is evicted from cache 500 and subsequently requested, a cache miss may occur, forcing the requesting instruction to wait until the evicted data is retrieved (e.g., from another cache or from a system memory). While cache conflicts may occur during the processing of any type of workload, sophisticated runtime memory management techniques may help to minimize the occurrence of index-based conflicts. For example, either cache hardware or an operating system for a multithreaded architecture configured to support execution of N threads may be configured to employ page coloring techniques to actively ensure that overlap is minimized in the set index fields of memory references for different ones of the N threads executing in different address spaces.

However, even if the set index conflicts among the memory references of N distinct threads of a trace are deliberately managed using a software or hardware-based page coloring or other type of scheme, replication of the N threads to generate an extended trace 430 as described above may introduce additional conflicts. For example, if one thread in a given trace 430 that includes a given memory reference is replicated eight times to generate an extended trace 430, and the resultant eight threads share access to an 8-way associative cache, then all 8 ways of the particular set corresponding to the original, replicated thread may be respectively occupied by replicas of the given memory reference, such that the next memory reference that attempts to store data to the particular set will experience a conflict. Further, since the set index portion of memory address 530 typically corresponds to low-order bits of the memory address, such conflicts may not be resolved by techniques that primarily affect higher-order bits of the memory address, such as the replica ID or offset techniques described above.

In one embodiment, index conflicts within a shared memory structure introduced by thread replication such as described above may be mitigated by applying a suitable hash function to all or some portion of the set index fields of memory references in the replicated threads. Generally speaking, for a given memory reference replicated among multiple threads, the hash function may be configured to distribute the given memory reference relatively uniformly across the possible values of the set index field among the replicated threads, thereby reducing the probability of introducing conflicts owing to replication. Using a hash function such as described below may, in some embodiments, reduce artifacts of thread replication such as artificial cache conflict misses such that a thread of a given trace 430 may be replicated many times in generating extended trace 430 while maintaining high model fidelity with respect to realistic system behavior. In some embodiments, such replication artifacts may be reduced to the point that a level of accuracy in simulating with an extended trace 430 having M threads generated through replication is comparable to—for example, within a difference of 10% or less for many workloads—the level of accuracy in simulating with a trace 430 having M threads generated directly (e.g., through system capture or simulation).

Figure 6:
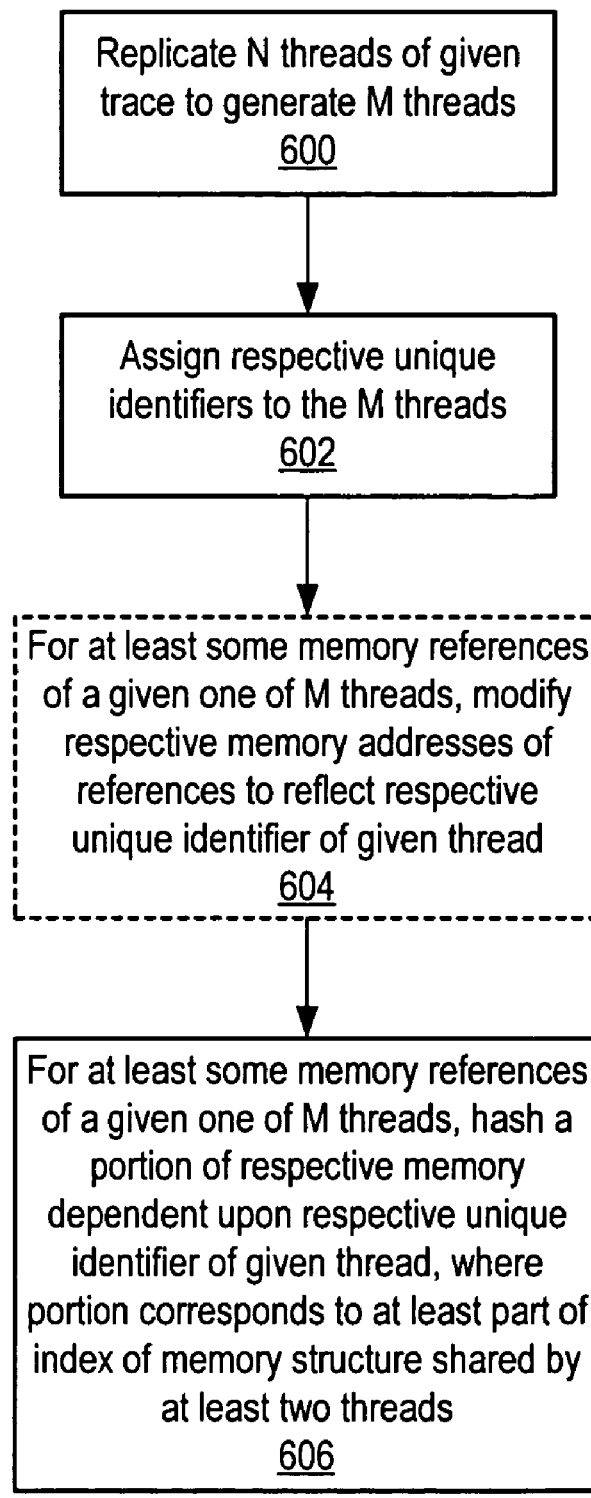
FIG. 6 is a flow diagram illustrating one embodiment of a method of generating an extended instruction trace from a given instruction trace.

One embodiment of a method of generating an extended trace 430 representative of M distinct threads of instruction execution from a given trace 430 representative of N distinct threads of execution, where M>N, is shown in FIG. 6. In the illustrated embodiment, operation begins in block 600 where the N threads of given trace 430 are replicated in a suitable fashion to generate M distinct threads. For example, as described above, the M threads may be generated in a modulo fashion such that an identifier of a given one of the M threads is a multiple of an identifier of a corresponding one of the N threads. Any other suitable mapping or correspondence between the threads of the given and extended traces 430 is possible and contemplated, including mappings in which different threads of the given trace 430 are replicated different numbers of times, or not at all. It is noted that while M may be an integral multiple of N, it need not be.

A respective unique identifier is assigned to each of the M threads of the extended trace 430 (block 602). This identifier may include a replica ID that may be derived from or independent of a thread identifier as employed within processor 10. For example, a unique integer from 0 to M-1 may be respectively associated with each of the M threads. In some embodiments, it is contemplated that assignment of a unique identifier as indicated in block 602 may be performed prior to actual replication of the threads of given trace 430 to generate the extended trace 430 as indicated in block 600. For example, such an assignment may be determined as a function of the number of threads N and M independent of the actual replication of threads. In other embodiments, assignment of a unique thread identifier may occur during replication of the N threads. That is, in such embodiments, the function of block 602 may be included within the function of block 600.

In some embodiments, for at least some memory references included in a given one of the M threads of extended trace 430, a portion of the respective memory addresses associated with the memory references may be modified to reflect the unique identifier of the given thread (block 604). For example, as described above, certain most significant bits of a memory address of a load or store instruction or another memory reference in a given thread may be modified to reflect a replica ID of the given thread, or an offset dependent on the replica ID may be added to the memory address. It is noted that the function of block 604 is optional and need not be performed in all embodiments of the method, and further noted that when performed, the function of block 604 need not be applied to every memory reference in a given thread of extended trace 430. For example, certain memory references may be deliberately allowed to share access to the same memory address following replication.

For at least some memory references included in a given one of the M threads of extended trace 430, a portion of the respective memory addresses associated with the memory references that corresponds to at least part of an index of a memory structure shared by at least two of the M threads may be hashed dependent upon the respective unique identifier of the given thread (block 606). For example, as described above, a portion of the memory address of a memory reference may correspond to some or all of the bits used to index a memory structure such as cache 500 (e.g., the set index portion of address 530 used to select one of sets 510). It is noted that in some embodiments, hashing of memory addresses for a given one of the M threads may occur at the same time that the given thread is replicated from one of the threads of given trace 430. That is, in some embodiments, the function of block 606 may be included in the function of block 600 along with the function of block 602. For example, hashing of memory addresses for the given thread may occur as the given thread is copied or replicated from given trace 430 to extended trace 430.

The specific hash function used may vary in various embodiments. In one embodiment, the hash function may be a simple exclusive-OR (XOR) function of the unique identifier associated with the given thread (e.g., its replica ID) and some or all of the address bits corresponding to the index of the shared memory structure. For example, if an 8-bit replica ID value is employed and address bits 15:8 correspond to the set index bits of a shared cache 500, then the hashed portion of any given memory address may be determined as:

$$\text{hashed\_address}[15{:}8] = \text{address}[15{:}8]\,\hat{}\,\text{replica\_ID}[7{:}0]$$

If the number of set index bits is larger than the number of bits of the unique identifier of the thread, in some embodiments only the most or least significant set index bits may be combined with the unique identifier. In other embodiments, it is contemplated that the hash function may include operations other than a logical XOR function, and need not preserve the original ordering of bits of the unique identifier or the address. In some embodiments, the hash function may be reversible, such that it may be computationally straightforward to determine from the hashed address either the original address or the unique thread identifier, given the other quantity. In other embodiments, the hash function need not be easily reversible.

In some embodiments, as described above, the unique identifier of the given thread may be indicated elsewhere within the memory address of a given memory reference, for example within certain upper bits of the memory address. In some such embodiments, the applied hash function may be configured to extract the identifier bits from the relevant portion of the memory address, align them appropriately with respect to the index bits, and then combine the aligned bits with the index bits according to the hash function. For an embodiment in which an 8-bit unique identifier is reflected in bits 55:48 of the memory address, one example of such a function may be given as follows:

$$\text{hashed\_address}[j{:}k] = (\text{address}[j{:}k]\,\hat{}\,(((\text{address}{>>}48)\,\&\,0\text{x}ff){<<}4))\,\&\,\text{mask}[j{:}k]$$

In this embodiment, the range of bits j:k of the address represents the index bits of the shared memory structure in question. This particular function extracts the thread identifier from the address by performing a 48 bit right shift of the address and masking off the lowest 8 bits of the result. As shown, the masked identifier is then shifted left by four bit positions, thus leaving the lowest four bits of the index bits unmodified by the hash function. This aspect may be useful in embodiments where it is desired to hash only a portion of the index bits, or where there are fewer thread identifier bits than index bits. Once the thread identifier value is extracted and properly aligned, it is XORed with the index bits and masked to limit the modified index bits to the range j:k. It is noted that while specific values for numbers of bits, shift amounts, mask sizes, etc. are discussed in this example, the hashing function shown may be generalized to reflect any suitable values as appropriate to a particular implementation It is noted that in various embodiments, the method shown in FIG. 6 for extended trace generation or a suitable variant may be employed during the process of collecting a trace from system execution or simulation as shown in FIGS. 4A-B, or dynamically during the simulation of a previously-collected trace. For example, in one embodiment either system 400 or execution-based model 450 may be configured to collect a trace representative of N threads of instruction execution. While collecting such a trace (or after the complete trace has been collected), either system 400 or model 450 may be configured to apply the method of FIG. 6 to generate and store an extended trace 430 representative of M threads of instruction execution, as described above. In various such embodiments, system 400 or model 450 may or may not be configured to additionally store a trace 430 representative of N threads of execution (e.g., the trace from which the extended trace 430 is generated).

In another embodiment, system 400 or model 450 may be configured to generate and store a given trace 430 representative of N threads of execution, as discussed above. Upon initialization or during operation, trace-based simulation model 440 may be configured to perform the method of FIG. 6 or a suitable variant to dynamically generate an extended trace 430 representative of M threads of execution from the previously generated and stored given trace 430. For example, model 440 may be configured to generate the entire extended trace 430 at once prior to beginning simulation, or may overlap generation of extended trace 430 with simulation of the extended trace. In some such embodiments, extended trace 430 may not be persistently stored, but instead dynamically generated on demand during model execution.

Exemplary System Embodiment

It is contemplated that in some embodiments, any of the methods or techniques described above may be implemented as program instructions and data capable of being stored or conveyed via a computer-accessible medium. Such methods or techniques may include, for example and without limitation, the functions of workload code 410, instrumentation software 420, trace 430, trace-based simulation model 440, and execution-based model 450, as well as the method illustrated in FIG. 6, and any suitable variations or portions thereof. Such program instructions may also be executed to perform computational functions in support of the methods and techniques described above, for example to instantiate operating system functionality, application functionality, and/or any other suitable functions.

Figure 7:
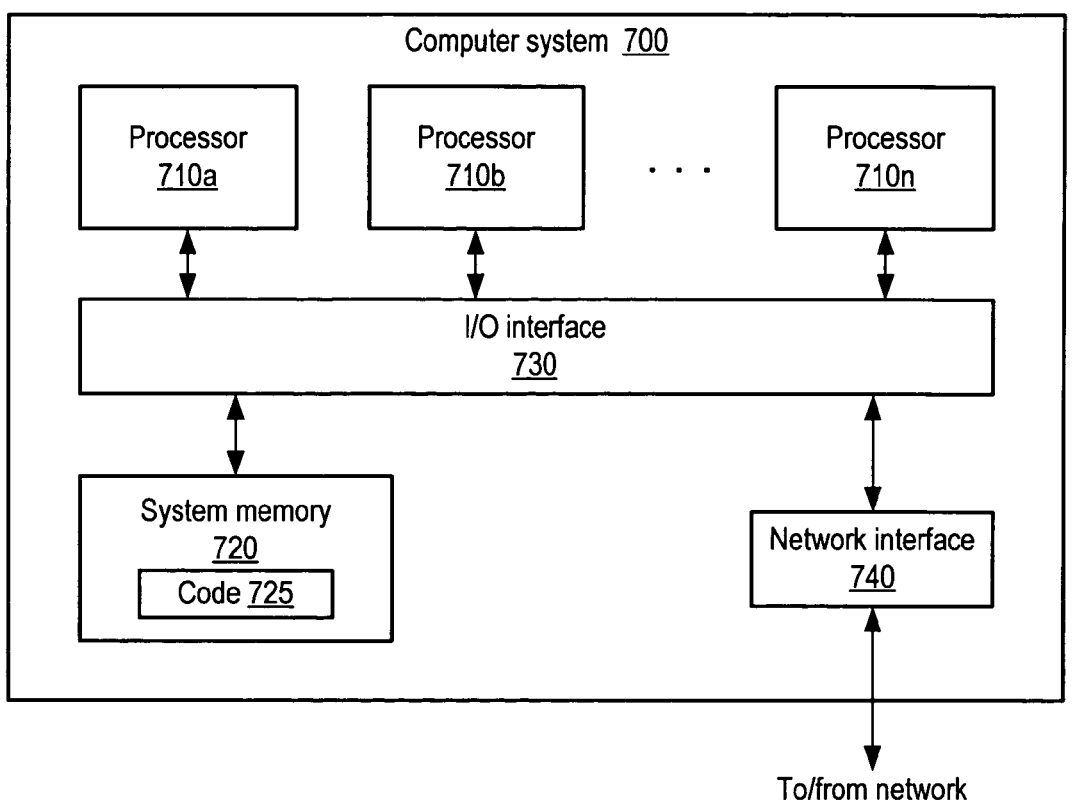
FIG. 7 is a block diagram illustrating an exemplary embodiment of a computer system.

One exemplary embodiment of a computer system including computer-accessible media is illustrated in FIG. 7. In the illustrated embodiment, computer system 700 includes one or more processors 710 coupled to a system memory 720 via an input/output (I/O) interface 730. Computer system 700 further includes a network interface 740 coupled to I/O interface 730.

In various embodiments computer system 700 may be a uniprocessor system including one processor 710, or a multiprocessor system including several processors 710 (e.g., two, four, eight, or another suitable number). Processors 710 may be any suitable processor capable of executing instructions. For example, in various embodiments processors 710 may be a general-purpose or embedded processor implementing any of a variety of instruction set architectures (ISAs), such as the x86, PowerPC, SPARC, or MIPS ISAs, or any other suitable ISA. In multiprocessor systems, each of processors 710 may commonly, but not necessarily, implement the same ISA. In one embodiment, one or more of processors 710 may be instances of processor 10 of FIG. 1.

System memory 720 may be configured to store instructions and data accessible by process 710. In various embodiments, system memory 720 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above, are shown stored within system memory 720 as code 725.

In one embodiment, I/O interface 730 may be configured to coordinate I/O traffic between processor 710, system memory 720, and any peripheral devices in the device, including network interface 740 or other peripheral interfaces. In some embodiments, I/O interface 730 may perform any necessary protocol, timing or other data transformations to convert data signals from one component (e.g., system memory 720) into a format suitable for use by another component (e.g., processor 710). In some embodiments, I/O interface 730 may include support for devices attached through various types of peripheral buses, such as a variant of the Peripheral Component Interconnect (PCI) bus standard or the Universal Serial Bus (USB) standard, for example. In some embodiments, the function of I/O interface 730 may be split into two or more separate components, such as a north bridge and a south bridge, for example. Also, in some embodiments some or all of the functionality of I/O interface 730, such as an interface to system memory 720, may be incorporated directly into processor 710.

Network interface 740 may be configured to allow data to be exchanged between computer system 700 and other devices attached to a network, such as other computer systems, for example. In various embodiments, network interface 740 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

In some embodiments, system memory 720 may be one embodiment of a computer-accessible medium configured to store program instructions and data as described above. However, in other embodiments, program instructions and/or data may be received, sent or stored upon different types of computer-accessible media. Generally speaking, a computer-accessible medium or storage medium may include mass storage media or memory media such as magnetic or optical media, e.g., disk or CD/DVD-ROM coupled to computer system 700 via I/O interface 730. A computer-accessible medium or storage medium may also include any volatile or non-volatile media such as RAM (e.g. SDRAM, DDR SDRAM, RDRAM, SRAM, etc.), ROM, etc.), that may be included in some embodiments of computer system 700 as system memory 720 or another type of memory. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 740.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method, comprising:
generating an extended instruction trace representative of M distinct threads of instruction execution from an instruction trace representative of N distinct threads of instruction execution, wherein N is an integer greater than or equal to 1, and wherein M is an integer greater than N;

wherein each of said N distinct threads of said instruction trace includes memory references to respective memory addresses, and wherein generating said extended instruction trace from said instruction trace comprises:

replicating said N distinct threads to generate said M distinct threads;

assigning a respective unique identifier to each of said M distinct threads; and for at least some of said memory references included in a given one of said M distinct threads, hashing a first portion of each of said respective memory addresses dependent upon said respective unique identifier of said given one of said M distinct threads, wherein said first portion of each of said respective memory addresses corresponds to at least part of an index of a memory structure shared by at least two of said M distinct threads.

2. The method as recited in claim 1, wherein generating said extended instruction trace from said instruction trace further comprises:

for said at least some of said memory references included in said given one of said M distinct threads, modifying a second portion of each of said respective memory addresses to reflect said respective unique identifier of said given one of said M distinct threads.

3. The method as recited in claim 1, wherein for a given one of said at least some of said memory references having a given respective memory address, said hashing a first portion of each of said respective memory addresses comprises performing an exclusive-OR function on a first portion of said given respective memory address and said respective unique identifier of said given one of said M distinct threads.

4. The method as recited in claim 1, wherein said memory structure corresponds to a set-associative cache memory.

5. The method as recited in claim 1, further comprising executing said N distinct threads of instruction execution on a computer system and generating said instruction trace dependent upon execution behavior of said computer system.

6. The method as recited in claim 1, further comprising simulating said N distinct threads of instruction execution within a simulation model and generating said instruction trace dependent upon simulation behavior of said simulation model.

7. The method as recited in claim 1, further comprising simulating said M distinct threads of instruction execution within a simulation model dependent upon said extended instruction trace.

8. The method as recited in claim 7, wherein generating said extended instruction trace is completed prior to said simulating said M distinct threads of instruction execution within a simulation model dependent upon said extended instruction trace.

9. The method as recited in claim 7, wherein generating said extended instruction trace occurs concurrently with said simulating said M distinct threads of instruction execution within a simulation model dependent upon said extended instruction trace.

10. The method as recited in claim 1, wherein for said given one of said M distinct threads, said respective identifier comprises a core identifier uniquely identifying a particular one of a plurality of processor cores and a thread identifier uniquely identifying said given one of said M distinct threads within said particular processor core.

11. A computer-accessible storage medium, comprising program instructions, wherein the instructions are computer-executable to:

generate an extended instruction trace representative of M distinct threads of instruction execution from an instruction trace representative of N distinct threads of instruction execution, wherein N is an integer greater than or equal to 1, and wherein M is an integer greater than N;

wherein each of said N distinct threads of said instruction trace includes memory references to respective memory addresses, and wherein to generate said extended instruction trace from said instruction trace, the instructions are further executable to:

replicate said N distinct threads to generate said M distinct threads;

assign a respective unique identifier to each of said M distinct threads; and for at least some of said memory references included in a given one of said M distinct threads, hash a first portion of each of said respective memory addresses dependent upon said respective unique identifier of said given one of said M distinct threads, wherein said first portion of each of said respective memory addresses corresponds to at least part of an index of a memory structure shared by at least two of said M distinct threads.

12. The computer-accessible storage medium as recited in claim 11, wherein to generate said extended instruction trace from said instruction trace, the instructions are further computer-executable to:

for said at least some of said memory references included in a given one of said M distinct threads, modify a second portion of each of said respective memory addresses to reflect said respective unique identifier of said given one of said M distinct threads.

13. The computer-accessible storage medium as recited in claim 11, wherein to hash a first portion of each of said respective memory addresses for a given one of said at least some of said memory references having a given respective memory address, the instructions are further computer-executable to perform an exclusive-OR function on a first portion of said given respective memory address and said respective unique identifier of said given one of said M distinct threads.

14. The computer-accessible storage medium as recited in claim 11, wherein said memory structure corresponds to a set-associative cache memory.

15. The computer-accessible storage medium as recited in claim 11, wherein the instructions are further computer-executable to generate said instruction trace dependent upon execution behavior of a computer system configured to execute said N distinct threads of instruction execution.

16. The computer-accessible storage medium as recited in claim 11, wherein the instructions are further computer-executable to simulate said N distinct threads of instruction execution within a simulation model and to generate said instruction trace dependent upon simulation behavior of said simulation model.

17. The computer-accessible storage medium as recited in claim 11, wherein the instructions are further computer-executable to simulate said M distinct threads of instruction execution within a simulation model dependent upon said extended instruction trace.

18. The computer-accessible storage medium as recited in claim 11, wherein for said given one of said M distinct threads, said respective identifier comprises a core identifier uniquely identifying a particular one of a plurality of processor cores and a thread identifier uniquely identifying said given one of said M distinct threads within said particular processor core.

19. A system, comprising:

a system memory configured to store instructions; and one or more processors configured to access said system memory, wherein the instructions are executable by at least one of said one or more processors to:

generate an extended instruction trace representative of M distinct threads of instruction execution from an instruction trace representative of N distinct threads of instruction execution, wherein N is an integer greater than or equal to 1, and wherein M is an integer greater than N;

wherein each of said N distinct threads of said instruction trace includes memory references to respective memory addresses, and wherein to generate said extended instruction trace from said instruction trace, the instructions are further executable by said at least one of said one or more processors to:

replicate said N distinct threads to generate said M distinct threads;

assign a respective unique identifier to each of said M distinct threads; and for at least some of said memory references included in a given one of said M distinct threads, hash a first portion of each of said respective memory addresses dependent upon said respective unique identifier of said given one of said M distinct threads, wherein said first portion of each of said respective memory addresses corresponds to at least part of an index of a memory structure shared by at least two of said M distinct threads.

20. The system as recited in claim 19, wherein to generate said extended instruction trace from said instruction trace, the instructions are further executable by said at least one of said one or more processors to:

for said at least some of said memory references included in a given one of said M distinct threads, modify a second portion of each of said respective memory addresses to reflect said respective unique identifier of said given one of said M distinct threads.

\* \* \* \* \*